Jan. 25, 1966  N. R. BROWNYER ETAL  3,231,258
VEHICLE SUSPENSION
Filed Dec. 19, 1962  4 Sheets-Sheet 1

INVENTOR.
Nelson R. Brownyer
BY Louis J. Jelsch
Strauch Nolan & Neale
Attorneys

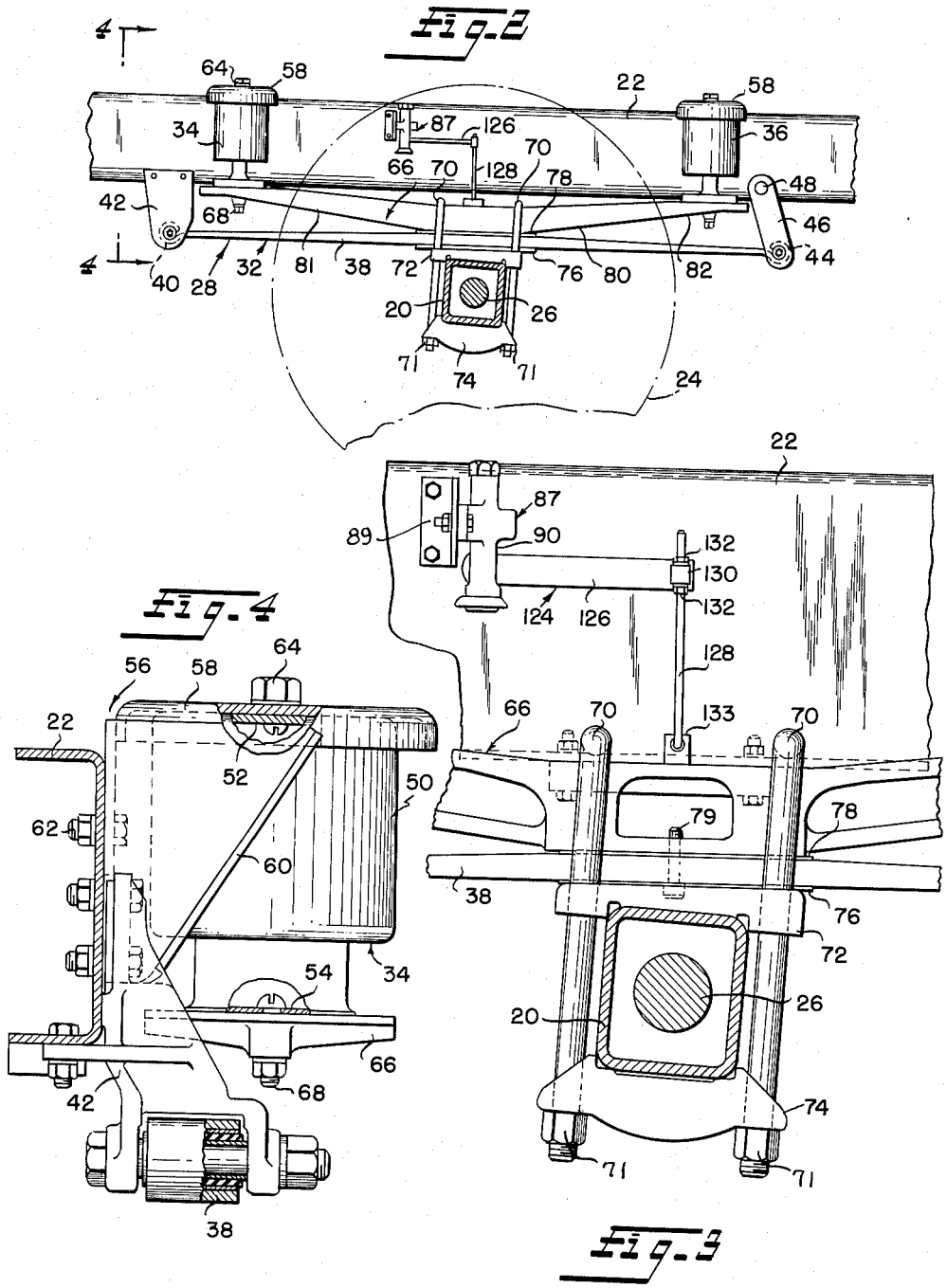

Jan. 25, 1966   N. R. BROWNYER ETAL   3,231,258
VEHICLE SUSPENSION
Filed Dec. 19, 1962   4 Sheets-Sheet 3
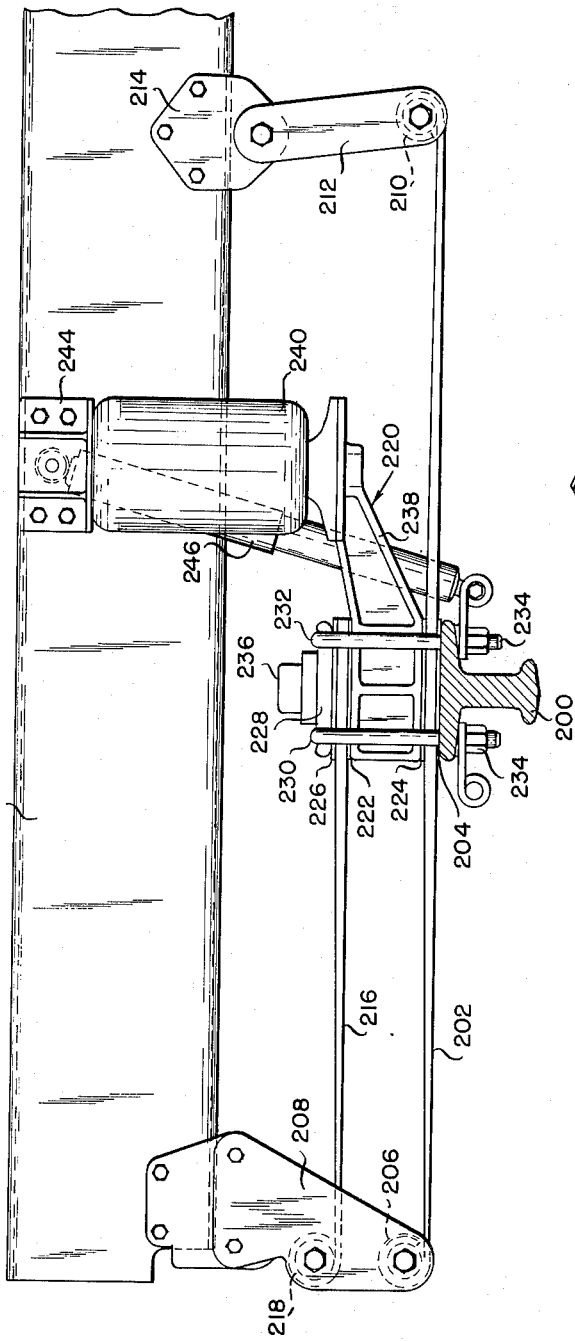
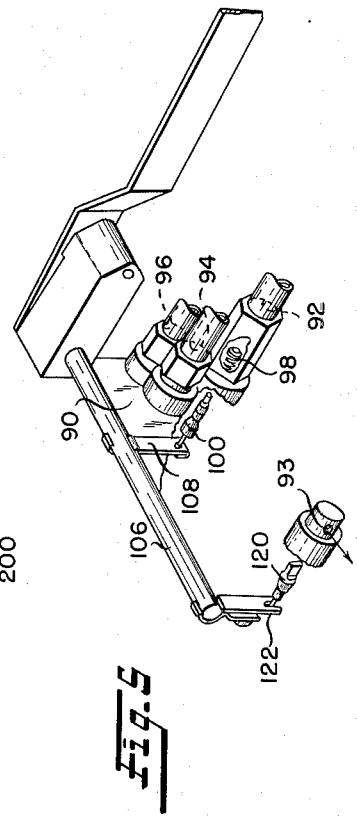
INVENTOR.
Nelson R. Brownyer
BY   Louis J. Jelsch
Attorneys INVENTOR.
Nelson R. Brownyer
Louis J. Jelsch
BY
Attorneys United States Patent Office 3,231,258
Patented Jan. 25, 1966

3,231,258
VEHICLE SUSPENSION
Nelson R. Brownyer, Birmingham, and Louis J. Jelsch, Pontiac, Mich., assignors, by mesne assignments, to Rockwell-Standard Corporation, a corporation of Delaware
Filed Dec. 19, 1962, Ser. No. 245,703
12 Claims. (Cl. 267—31)

The present invention relates to vehicle suspensions and more particularly to combined air and leaf spring suspensions especially for commercial vehicles such as trucks and buses.

In vehicle suspensions, it has been common practice in the past to employ longitudinally attached leaf springs because of their satisfactory performance in handling heavy loads, in providing axle alignment, and in absorbing braking torque in assembled relation between the frame and axle of the vehicle. A basic disadvantage of leaf spring suspensions, however, is that they generally are not capable of providing a variable deflection rate and are usually designed to provide the best ride with an average load. In an empty vehicle, therefore, the ride may be too hard whereas the same suspension for a vehicle loaded to capacity may be too soft. In an effort to overcome this shortcoming of prior art leaf spring suspensions, mechanical load equalizing devices have been proposed but have been found to be generally ineffective and usually too complicated and costly to be commercially worthwhile.

Air springs, on the other hand, are capable of providing a variable deflection rate but are unsuitable for heavy commercial vehicles due to the resulting unavoidable soft suspension response which is objectionable from the standpoint of vehicle stability. Air spring suspensions also have been found to be unsuitable in commercial vehicles to provide adequate axle alignment, to effectively transfer driving and braking torques, and to prevent sidesway of the vehicle.

It is, accordingly, a primary object of the present invention to provide a novel air and leaf spring vehicle suspension which is effective to provide a comfortable ride under variable load conditions and in which the leaf springs assure axle alignment and torque transfer while the air springs are effective as load equalizers.

Another object of the present invention is to provide a novel air and leaf spring vehicle suspension having a variable rate air spring unit to maintain constant frame height, thus assuring a more uniform distribution of weight.

Still another object of the present invention is to provide in a semi-trailer tractor front and rear axle spring suspensions each utilizing combined air and leaf spring units in which the leaf springs carry all curb loads and the air springs carry all loads in excess of the curb load to obtain optimum conditions for both empty and loaded rides.

A further object is to provide a novelly combined air and leaf vehicle suspension in which the air springs are operatively disposed forwardly and rearwardly of the vehicle axle to absorb driving and braking loads without allowing the axle to excessively wind up beyond the drive line joint capacity.

Still a further object of the present invention resides in the provision of a combined air and leaf spring vehicle suspension in which the air springs are expansible and contractible along axes disposed laterally outwardly of the vehicle frame and of the longitudinal center line of the leaf springs to improve the roll resistance of the vehicle.

Another object is the provision in a novel air and leaf spring vehicle suspension in which the air springs on opposite sides of the vehicle frame are provided with separate independently operated leveling valves interposed in separate fluid circuits to maintain roll and windup stiffness and to prevent flow of pressurized air from one circuit to the other circuit.

Further objects of the invention will appear as the description proceeds in connection with the appended claims and the annexed drawings wherein:

FIGURE 2 is a fragmentary partially sectioned side elevation of the novel suspension assembly illustrated in FIGURE 1;

FIGURE 3 is an enlarged fragmentary side elevational view of the center region of the suspension and axle assembly illustrated in FIGURE 2;

FIGURE 4 is an enlarged fragmentary section taken substantially along lines 4—4 of FIGURE 2;

FIGURE 5 is a perspective partially exploded view of the leveling valve illustrated in FIGURE 3;

FIGURE 7 is a side partially sectioned elevational view of still another embodiment of the present invention;

FIGURE 10 is a side partially sectioned elevational view of still a further embodiment of the present invention.

Figure 1:
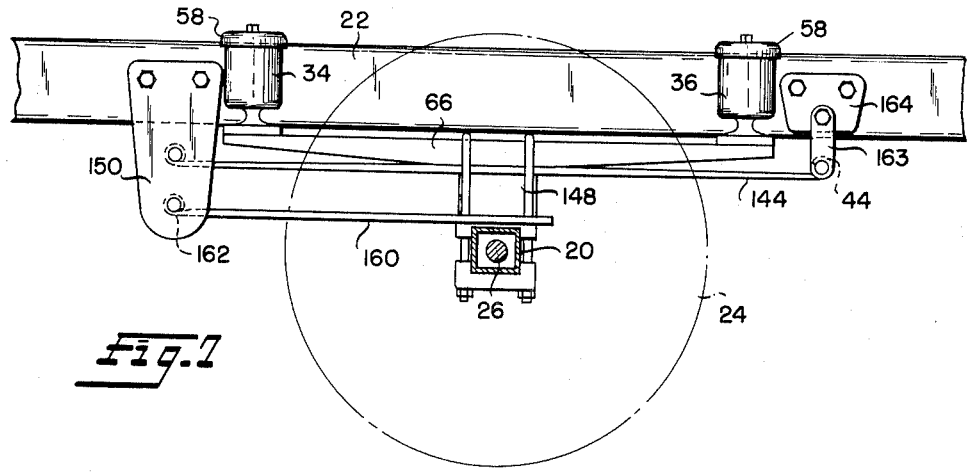
FIGURE 1 is a fragmentary plan view of a vehicle frame, an axle assembly incorporating the air and leaf spring suspension according to one embodiment of the present invention and diagrammatically illustrating the fluid circuit for the air springs of the suspension assembly.
Figure 1:
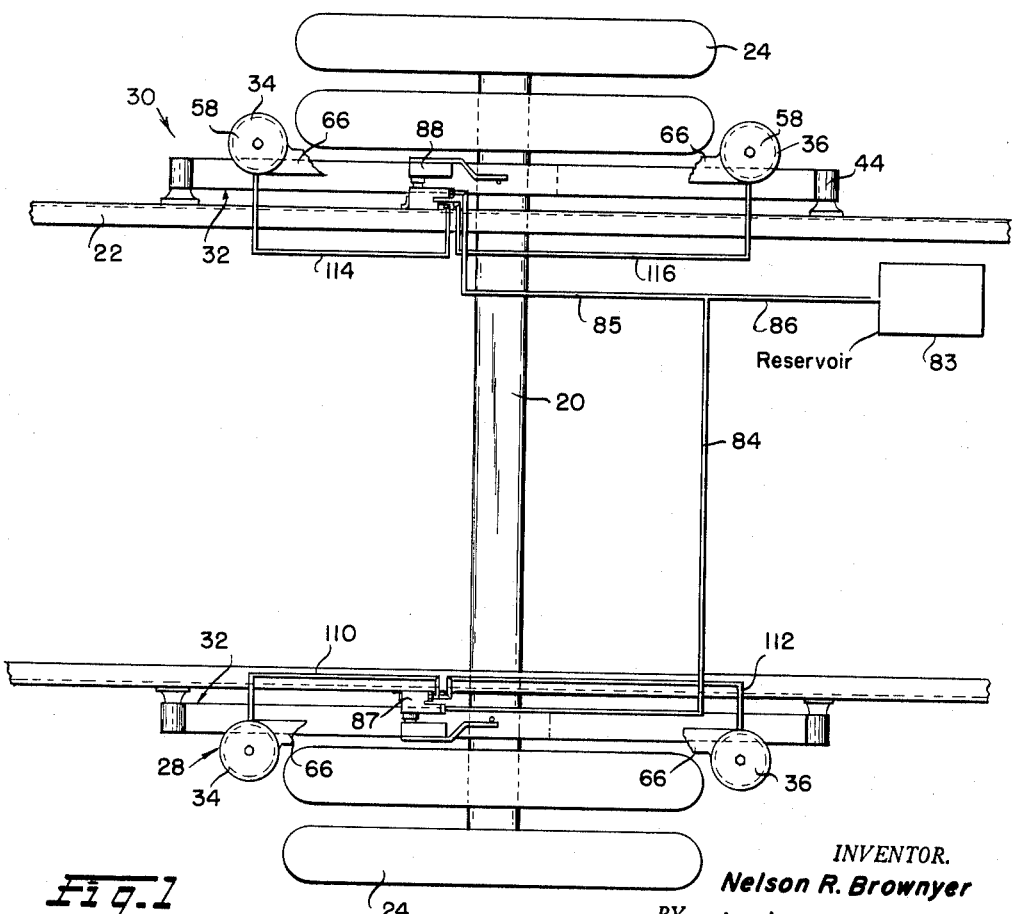

Referring now to the drawings wherein like reference numerals designate like parts and more particularly to FIGURES 1 and 2, the reference numeral 20 designates a hollow rigid rear axle of a vehicle such as an engine driven semi-trailer tractor. Axle 20 extends transversely beneath a rigid vehicle body supporting frame 22 and is supported at opposite ends by rotable ground engaging wheels 24. Wheels 24 may be suitably coupled to a drive shaft 26 (FIGURE 2) extending through axle 20 in the usual manner.

With continued reference to FIGURES 1 and 2, frame 22 is suspended upon axle 20 by novel air and leaf spring suspension assemblies 28 and 30 (FIGURE 1) interposed between the opposite outer ends of rear axle 20 and frame 22. Suspension assemblies 28 and 30 also may be adapted to non-driven front or rear vehicle axle units. The construction of suspension assemblies 28 and 30 at opposite ends of rear axle 20 are identical so that a description of but one of such assemblies will suffice.

Thus, with reference to FIGURES 2 and 3, suspension assembly 28, according to a preferred form of the invention, comprises a leaf spring unit 32 and a pair of axially expansible and contractible air spring units 34 and 36 respectively disposed equidistantly and symmetrically forwardly and rearwardly of the longitudinal axis or rear axle 20. Leaf spring unit 32 consists of a full length single spring leaf 38, the mid-portion of which is fixed on top of axle 20 in a manner to be presently described. Spring leaf 38 extends longitudinally of frame 22 and is formed at its forward end with an attaching eye 40 pivotally secured to a bracket 42 which is fixed to frame 22. The rearward end of spring leaf 38 also is provided with an eye 44 attached to a shackle 46 which is pivotally secured at 48 to frame 22. Spring leaf 38 is preferably formed with a uniform width and decreasing tapers from a central region of uniform maximum thickness fixed to rear axle 20 out to eyes 40 and 44.

With reference now to FIGURES 2–4, air spring units 34 and 36 are of identical construction and are preferably of the known GYRL–900 spring units manufactured by the Goodyear Tire and Rubber Company. Each air spring unit essentially comprises a flexible bag 50 closed at opposite ends by rigid metallic upper and lower end plugs 52 and 54. Air spring units 34 and 36 are each secured to frame 22 by means of a support bracket assembly 56 comprising a top cover member 58 extending over the top of end plug 52 and fixed, as by welding, to a bracket 60. Bracket 60 is fixed to frame 22 as by nut and bolt assemblies 62 and extends laterally outwardly from frame 22 along the axis of rear axle 20 so that cover member 58 is positioned laterally outwardly from frame 22 in the manner best shown in FIGURE 4. Cover member 58 is fixedly secured to the top end plug 52 as by a nut and bolt assembly 64.

As best shown in FIGURES 2 and 4 the bottom end plugs 54 of air spring units 34 and 36 are respectively fixed to opposite ends of a rigid non-deflectable support beam 66 as by nut and bolt assemblies indicated at 68. Air spring units 34 and 36 are thus axially confined vertically between their respective cover members 58 and the opposite ends of support beam 66 and are axially expansible and contractible along parallel vertical axes disposed laterally outwardly of spring leaf 38 and frame 22 in substantially perpendicular relationship to the longitudinal axis of rear axle 20.

As best seen from FIGURES 1 and 4, air spring units 34 and 36 are bodily spaced by a predetermined distance laterally outwardly of the outermost longitudinal side rail member of frame 22 at a level above spring leaf 38 which is also spaced laterally outwardly from frame 22. By positioning air spring units 34 and 36 in the assemblies 28 and 30 at both ends of axle 20 and laterally outwardly of frame 22 and of the longitudinal center line of spring leaf 38 in the foregoing manner, units 34 and 36 afford exceptionally effective resistance to vehicle roll.

With continued reference to FIGURES 2 and 3, beam 66 and spring leaf 38 extend above axle 20 and are fixed midway between their corresponding ends to axle 20 by conventional U-shaped clamping bolts 70 spaced substantially equidistantly forwardly and rearwardly of axle 20 and straddling beam 66 and spring leaf 38. Bolts 70 extend through apertured upper and lower clamping brackets 72 and 74 respectively disposed on top of and beneath axle 20. Wear plates 76 and 78 are respectively disposed between bracket 72 and spring leaf 38 and between beam 66 to minimize scuffing wear due to spring deflection. Plates 76 and 78 may also be utilized as spacer members to properly position beam 66 and spring leaf 38. Beam 66, spring leaf 38, brackets 72 and 74 and wear plates 76 and 78 are securely clamped together by nuts 71 threaded on the downwardly depending ends of bolts 70. Support beam 66 and spring leaf 38 are maintained in centered relation to each other and to axle 20 by means of a pin 79 extending through bracket 72 and leaf 38 and partially through beam 66.

Support beam 66, as shown in FIGURES 2 and 3, is formed with a central portion 80 seated on plate 78 and integrally joining upwardly sloped forward and rearward arm portions 81 and 82 which are turned slightly outwardly to position air spring units 34 and 36 in the manner previously described.

In accordance with the present invention spring leaf 38 supports the nominal or curb load of the vehicle and provides axle guidance, lateral stability, wind-up resistance and transfer of braking and driving torque to the vehicle frame 22. Air spring units 34 and 36 of suspension assemblies 28 and 30 support all loads in excess of the nominal or curb load of the vehicle. Air spring units 34 and 36 further assist leaf spring unit 32 in absorbing driving and braking torque due to their previously described positions relative to axle 20 and frame 22.

With continued reference to FIGURE 1, the air pressure in air spring units 34 and 36 of assemblies 28 and 30 is automatically controlled by a compressed air system to maintain a predetermined spatial relationship between the ends of axle 20 and frame 22. As will be presently described in detail, the air pressures in the air spring units of assemblies 28 and 30 on opposite sides of frame 22 are independently controlled in response to relative displacement between axle and frame from a predetermined norm.

With continued reference to FIGURE 1, the system controlling air pressure in air spring units 34 and 36 of assemblies 28 and 30 comprises an air tank 83 to which compressed air is supplied from a suitable engine driven air compressor (not shown). Air tank 83 is connected to two separate branch fluid conduits 84 and 85 by means of a main fluid supply conduit 86. Branch conduits 84 and 85 each are separately connected to leveling valves 87 and 88 for independently controlling the air pressure in the air spring units of suspension assemblies 28 and 30 respectively. Leveling valves 87 and 88 are of the same construction and preferably are the known Delco height control valves. Each of these height control valves, as best shown in FIGURES 3 and 5, is mounted on frame 22 by a bracket 89 and essentially comprises a valve body 90 providing an inlet port 92, an atmospheric exhaust port 93 and dual operational ports 94 and 96. Inlet port 92 is connected to the associated one of the branch conduits 84 and 85 and is in fluid communication with operational ports 94 and 96 through suitable internal fluid passages formed in valve body 90. Disposed in inlet port is a check valve 98 which prevents reverse flow from the passages in valve body 90 to the branch supply conduits 84 and 85.

With continued reference to FIGURE 5, a flow control intake valve core 100 disposed in port 92 is provided with a suitable stem connected to a rotatably mounted shaft 106 by a lever arm 108 such that rotation of shaft 106 will open and close valve core 100 for permitting air to flow through port 92.

With continued reference to FIGURE 1, the ports 94 and 96 of valve 87 are respectively connected to air spring units 34 and 36 of assembly 28 by fluid conduits 110 and 112 and the ports 94 and 96 of valve 88 are respectively connected to units 34 and 36 of assembly 30 by conduits 114 and 116. Valves cores 100 of valves 87 and 88 thus independently control the air pressure supply to units 34 and 36 of suspension assemblies 28 and 30 respectively.

With continued reference to FIGURE 5, exhaust port 93 is in fluid communication with ports 94 and 96. Disposed in exhaust port 93 of each valve 87 and 88 is a valve core 120 having a valve operating stem connected to shaft 106 by a lever arm 122. With this valve structure, rotation of shaft 106 in one predetermined direction will open valve core 100 and close valve core 120, permitting a predetermined amount of air to be introduced into the connected air spring units. When shaft 106 is rotated in the opposite direction, core 120 will open and core 100 will close permitting a predetermined amount of air to be exhausted from the connected air spring units.

With continued reference to FIGURE 3, the shaft 106 of valve 87 is connected by a motion transmitting linkage 124 to the beam 66 in suspension assembly 28. Linkage 124 comprises a lever 126 secured at one end to shaft 106. An upstanding rod 128 is pivotally secured through a collar 130 to the opposite end of lever 126. Collar 130 is held in place on rod 128 by nuts 132. The position of lever 126 along rod 128 is adjustable by backing off nuts 132 and shifting collar 130. Rod 128 is secured at its lower end to a bracket 133.

Similarly, shaft 106 of valve 88 is independently connected to beam 66 of suspension assembly 30 by a motion transmitting linkage which is of the same construction as linkage 124 with like reference numerals identifying like parts.

With the foregoing construction, it is clear that displacement of axle 20 relative to frame 22 rotates shafts 106 of valves 87 and 88 to actuate valve cores 100 and 120 for admitting and exhausting air with respect to air spring units 34 and 36. Thus, valves 87 and 88 are independently responsive to relative displacement between axle 20 and frame 22 to automatically control the air pressure in the air spring units of assemblies 28 and 30 respectively. When a normal predetermined spatial relationship exists between frame 22 and axle 20, fluid communication between ports 94 and ports 92 and 93 of each of the valves 87 and 88 is blocked, thus preventing compressed air from being introduced to or exhausted from air spring units 34 and 36 of suspension assemblies 28 and 30. When frame 22 is lowered relative to axle 20 to make the spatial relationship less than the predetermined norm, valves 87 and 88 are actuated in response to this relative movement to independently connect air springs 34 and 36 of assemblies 28 and 30 to the main fluid supply conduit 86 to introduce compressed air into air spring units 34 and 36. As a result, spring units 34 and 36 are expanded to raise frame 22 and thereby restore the predetermined spatial relationship between frame 22 and axle 20. Similarly, when the spring between axle 20 and frame 22 becomes greater than the predetermined norm, valves 87 and 88 are actuated to exhaust compressed air from air spring units 34 and 36 of assemblies 28 and 30 respectively to restore the predetermined spatial relationship. As a result, the level of frame 22 relative to axle 20 is automatically maintained substantially constant by valves 87 and 88.

With the foregoing novel spring suspension structure, it is clear that the suspension action is governed by the substantially constant leaf spring rate, as modified by the variable rate of air spring units 34 and 36 in each of the suspension assemblies at opposite ends of axle 20. This novel suspension construction permits leaf springs of lower rates to be employed to thus improve the riding qualities of the vehicle particularly under unloaded conditions. It is also clear that valves 87 and 88 isolate the air spring units 34 and 36 in suspension assembly 28 from the air spring units 34 and 36 in suspension assembly 30 so that flow of compressed air between the air spring units of the respective suspension assemblies 28 and 30 is precluded at all times. Suitable shock absorbers, as shown in FIGURE 10, may be employed to provide an added control for a balanced ride.

The foregoing combined air and leaf spring suspension is especially suitable for rear axles of commercial vehicles and particularly in suspending frames of trailer tractors for maintaining the fifth wheel of the tractor at a constant height to thus provide a uniform and improved trailer load distribution. Due to the outward location and spacing of the air springs fore and aft of the axle, the roll resistance of the vehicle is improved and driving and braking loads are absorbed without allowing the axle to wind up beyond the drive line capacity.

Figure 6:
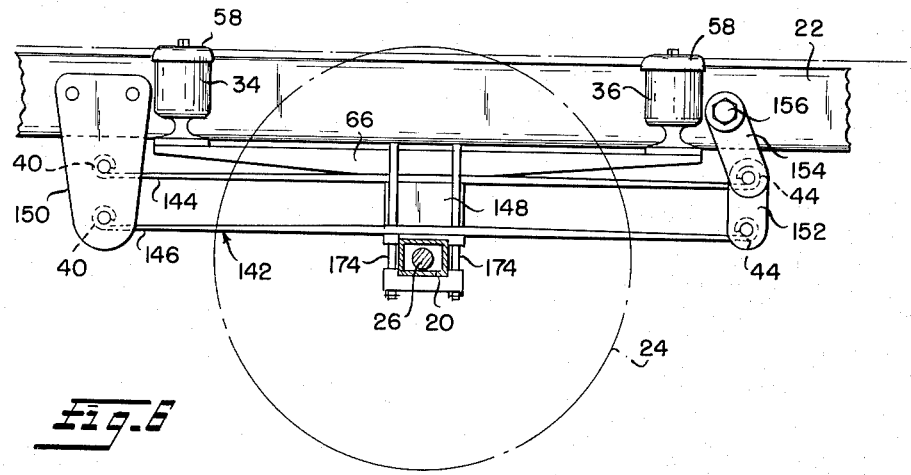
FIGURE 6 is a side partially sectioned side elevational view of another embodiment of the present invention.

In the embodiment shown in FIGURE 6, a modified leaf spring unit is illustrated in place of leaf spring unit 32 and is generally designated by the reference character 142. Leaf spring unit 142 comprises only a pair of full length upper and lower spring leaves 144 and 146 extending longitudinally of frame 22 in substantially parallel relation at different vertical levels. Spring leaves 144 and 146 are each of the same construction as spring leaf 38 with like reference numerals identifying like parts and are also preferably formed with decreasing tapers from a central region of uniform maximum thickness fixed to rear axle 20 out to the spring leaf eyes.

With continued reference to FIGURE 6, spring leaves 144 and 146 extend above axle 20 and are secured at their corresponding mid-regions to axle 20 as by the usual U bolts. Leaves 144 and 146 are separated at their mid-regions vertically above axle 20 by a spacer block 148 which is clamped in place on axle 20. In this embodiment, air spring support beam 66 is seated upon the mid-region of the upper spring leaf 144 and is centrally secured to axle 20 in the same manner previously described.

The forward eyes 40 of leaves 144 and 146 are pivotally connected in adjacent vertically spaced relation to a hanger bracket 150 which is suitably fixed to frame 22. The rearward eyes 44 of leaves 144 and 146 are pivotally connected to a dual shackle 152. Shackle 152 is pivotally secured to a pivot link 154 attached at 156 to frame 22.

In the embodiment illustrated in FIGURE 7, the lower spring leaf 146 of unit 142 is replaced by a half-spring leaf 160 having its rearward end secured to axle 20 beneath spacer block 148. Spring leaf 160 extends forwardly of axle 20 in substantially parallel spaced apart relationship vertically below spring leaf 144 and is formed at its forward end with an attaching eye 162 pivotally connected to bracket 150 in adjacent vertically spaced relation below the pivot connection of leaf 144 to bracket 150. Leaf 160 is preferably formed with a decreasing taper from an end region of uniform maximum thickness secured to axle 20 out to eye 162. In this embodiment illustrated in FIGURE 7, the rearward attaching eye 44 of spring leaf 144 is attached to a shackle 163 which is pivotally secured to a brackek 164 fixed on frame 22.

Figure 8:
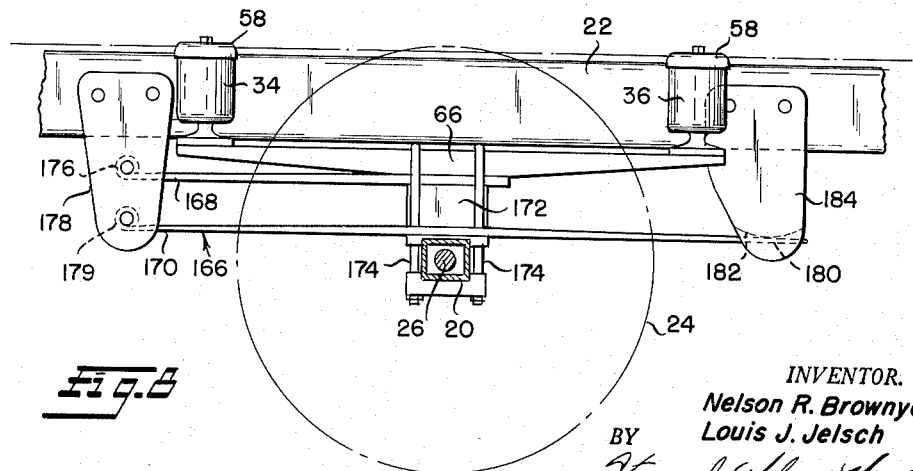
FIGURE 8 is a side partially sectioned elevational view of a further embodiment of the present invention.

FIGURE 8 illustrates another embodiment in which a further modified leaf spring unit 166 is shown in place of leaf spring unit 32. Unit 166 comprises only a pair of spring leaves 168 and 170 extending longitudinally of frame 22 in substantially parallel relation at different vertical levels. Leaf 168 is spaced vertically above leaf 170 and is rigidly clamped at its rearward end between support beam 66 and a spacer block 172 by the usual U-bolts 174. Leaf 168 extends forwardly of axle 20 and terminates at its forward end in an eye 176 pivotally secured to a hanger bracket 178 which is fixed to frame 22.

Spring leaf 170 below leaf 168 is rigidly clamped by U-bolts 174 substantially midway between its end between spacer block 172 and axle 20. Spring leaf 170 is formed at its forward end with an attaching eye 179 pivotally secured to bracket 178. The rearward end of spring leaf 170 comprises a flat portion 180 slidably engaging a downwardly facing curved abutment 182 rigid with a bracket 184. Bracket 184 is fixed to frame 22 in any suitable manner.

With the foregoing leaf spring construction, the portions of leaves 168 and 170 extending forwardly of axle 20 effectively form torque rods to transmit braking and driving forces. The rearward portion of leaf 170 takes any lateral load and vertical deflection loading. The portions of leaves 168 and 170 extending between axle 20 and the pivot connection to bracket 178 substantially form a parallelogram with axle 20 and bracket 178. Spring leaves 168 and 170 preferably are tapered in the same manner as spring leaves 144 and 160.

The air spring units and the compressed air control system in the embodiments of FIGURES 6–8 are the same as that described in connection with the embodiment of FIGURES 1–5.

Figure 9:
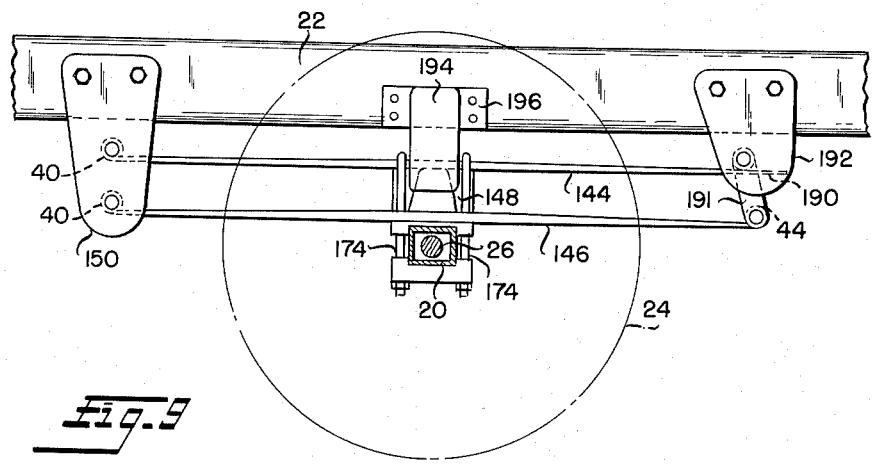
FIGURE 9 is a side partially sectioned elevational view of still a further embodiment of the present invention.

In the embodiment illustrated in FIGURE 9 the leaf spring unit is essentially the same as spring unit 142 shown in FIGURE 6 except that the rearward end of spring leaf 144 is flat as indicated at 190 and shackles 152 and 154 are replaced by a single shackle 191. End 190 is longitudinally shiftable within a bracket 192 fixed to frame 22. Eye 44 of leaf 146 is attached to shackle 191 which is pivotally secured to bracket 192.

In the suspension assembly illustrated in FIGURE 9, the fore and aft air spring units 34 and 36 of the embodiments of FIGURES 1–8 are replaced at each end of axle 20 with a single air spring unit 194 secured between axle 20 and a bracket 196 fixed to frame 22. Spring unit 194 may be of the same construction as air spring units 34 and 36 and is disposed vertically above axle 20. Unit 194 is expansible and contractible along an axis disposed laterally outwardly of frame 22 and of the center lines of spring leafs 144 and 146 in the same manner as described in the embodiments of FIGURES 1-8. The compressed air control system for air spring unit 194 is preferably the same as that described in connection with the embodiments of FIGURES 1-8 except that one of the two conduits 114 and 116 at one end of axle 20 and one of the two conduits 110 and 112 at the other end of axle 20 are omitted.

FIGURE 10 illustrates the application of the present novel suspension system to the front end of a commercial vehicle wherein the reference character 200 designates a vehicle front axle. A single tapered full length spring leaf 202 is clamped midway between its ends to axle 200 and is seated on an axle spacer or wear plate 204 overlying axle 200. Leaf 202 extends longitudinally of the vehicle frame 22 and is provided at its forward end with an eye 206 which is attached to a hanger bracket 208. Bracket 208 suitably is fixed to the vehicle frame 22. The rear end of leaf 202 is likewise provided with an eye 210 attached to a shackle 212 which is pivotally secured to a bracket 214. Bracket 214 is fixed to frame 22.

Spaced vertically upwardly from leaf 202 is a half-leaf 216 extending forwardly of axle 200 and having an attaching eye 218 secured to bracket 208 in vertically spaced relation above eye 206. The rear end of leaf 216 is cantilever supported on the end of a beam 220 seated on a wear plate 222 underlying leaf 216. Beam 220 is clamped with leaf springs 202 and 216 vertically above axle 200 and is seated on a wear plate 224 disposed vertically between beam 220 and leaf 202. Seated on top of the rear end of the cantilever leaf 216 is still another wear plate 226. A clamp bracket 228 is seated on top of plate 226. U-bolts 230 and 232 straddle the entire leaf and beam assembly to tightly clamp the leaf and beam assembly to the axle 200 by nuts 234 threaded on the lower ends of U-bolts 230 and 232. A rubber bumper 236 may be provided on top of the assembly to prevent bottoming of the frame 22 against axle 200.

Beam 220 is formed with arm 238 which extends rearwardly from axle 200 and slightly upwardly and outwardly. Arm 238 supports at its rearward end an air spring 240, the upper end of which abuts against a bracket 244 secured to frame 22. Air spring 240 is suitably connected by means not shown to the compressed air tank 83 (FIGURE 1) and may be of the same construction as air springs 34 and 36. In this embodiment, air spring 240 is expansible and contractible along a vertical axis disposed laterally outwardly of frame 22 and of the center lines of spring leaves 202 and 216 in a manner similar to that previously described.

A shock absorber 246 may be operatively interposed between axle 200 and frame 22 to the rear or in front of axle 200 for optimum balanced ride condition.

Leaf springs 202 and 216 also carry all curb loads for the best static deflection and the air spring 240 carries the load in excess of the curb loads. Axle positioning and wind-up stiffness is provided by the upper half-leaf 216 and air spring 240 absorbs a great deal of the braking torque by its position rearwardly of axle 200.

Thus an effective improved front end suspension is provided for which advantageously may be used together with the novel rear axle air and leaf spring suspension previously described. Both front and rear suspensions, it will be appreciated, may be used separately if desired.

The present invention may be embodied in other specific forms without departing from the essential characteristics and spirit thereof, therefore, the present invention is being considered in all respects as illustrative only and not restrictive, the scope of the invention being indicated by the appended claims rather than by the foregoing description.

What is claimed and desired to be secured by United States Letters Patent is:

1. In a vehicle, a frame, an axle assembly extending transversely of said frame, and a spring suspension system comprising a pair of spring suspension assemblies connecting said frame to opposite ends of said axle assembly, each of said suspension assemblies comprising a leaf spring assembly extending longitudinally of said frame and laterally outwardly thereof, means securing said leaf spring assembly rigidly to said axle assembly, means pivotally securing at least one end of said leaf spring assembly to said frame, a rigid non-deflectable beam extending longitudinally of said frame above said leaf spring assembly and being fixed substantially mid-way between the ends thereof to said axle assembly, a pair of air springs disposed equi-distantly forwardly and rearwardly of said axle assembly and being expansible and contractable along essentially parallel axes, disposed laterally outwardly of the longitudinal centerline of said leaf spring assembly, and means operably connecting each of said air springs to said frame and to the opposite ends of said beam to provide a suspension connection in parallel relation with said leaf spring assembly.

2. The vehicle defined in claim 1 comprising:
    (a) a source of fluid under pressure,
    (b) conduit means connecting the air springs of each of said suspension assemblies with said source, and
    (c) valve means interposed in said conduit means and being responsive to relative displacement between said axle assembly and said frame for automatically and independently controlling the introduction and exhaust of pressurized fluid with respect to said air springs of said suspension assemblies to substantially maintain a predetermined spatial relationship between said frame and said axle assembly.

3. The vehicle defined in claim 2 wherein said conduit means comprises a pair of branch conduits each connected to the air springs of one of said suspension assemblies, and wherein said valve means comprises a pair of leveling valves interposed one in each of said branch conduits and having means for preventing interflow of fluid between the respective air springs of said spring suspensions.

4. The vehicle defined in claim 3 wherein each of said leveling valves comprises a shiftable actuator member, and a motion transmitting linkage operatively connecting said actuator to said axle assembly.

5. The vehicle defined in claim 1 wherein each said leaf spring assembly consists essentially of a single spring leaf intermediately secured to said axle assembly and pivotally connected at opposite ends to said frame.

6. The vehicle defined in claim 1 wherein each said leaf spring assembly comprises two parallel spring leaves intermediately secured to said axle assembly and pivotally connected at opposite ends to said frame.

7. The vehicle defined in claim 1 wherein each said spring assembly consists of a first spring leaf secured intermediately to said axle assembly and pivotally connected at opposite ends to said frame and a second spring leaf fixed at one end to said axle assembly and pivotally connected at its other end to said frame.

8. In a vehicle, a frame, an axle assembly extending transversely of said frame, and a spring suspension system comprising a pair of spring suspension assemblies connecting said frame to opposite ends of said axle assembly, each of said suspension assemblies comprising a leaf spring assembly extending longitudinally of said frame and laterally outwardly thereof, means securing said leaf spring assembly rigidly to said axle assembly, means pivotally securing at least one end of said leaf spring assembly to said frame, a rigid non-deflectable beam extending longitudinally of said frame above at least part of said leaf spring assembly and being fixed to said axle assembly, an air spring disposed in longitudinally spaced relation with respect to said axle assembly and expansible and contractible on a generally vertical axis disposed laterally outwardly of the longitudinal centerline of said leaf spring assembly, and means operably connecting the upper and lower ends of said air spring to said frame and to an end of said beam in longitudinally spaced relation to said axle assembly to provide a suspension connection in parallel relation with said leaf spring assembly.

9. In the vehicle defined in claim 8, each said leaf spring assembly comprising one spring leaf intermediately secured to said axle assembly and pivotally connected at opposite ends to said frame, and another spring leaf fixed at one end to said axle assembly and pivotally connected at its other end to said frame, said other spring and said beam projecting in opposite longitudinal directions from said axle assembly.

10. In the vehcle defined in claim 9, a shock absorber connected between the axle assembly and the frame in parallel relation to said air spring.

11. In combination in a vehicle,
   (1) a frame,
   (2) a transverse axle assembly beneath said frame,
   (3) and a spring suspension connecting said frame and said axle assembly comprising at each side of the frame:
      (a) a leaf spring unit consisting only of a single spring leaf,
      (b) means pivotally connecting the opposite ends of said spring leaf to said frame and positioning said spring leaf to extend longitudinally of said frame laterally outside said frame,
      (c) means securing said spring leaf intermediate its ends to said axle assembly,
      (d) a pair of spring units connected between said axle assembly and said frame forwardly and rearwardly of said axle assembly,
      (e) and a rigid beam connected intermediate its ends to the axle assembly and operatively connected at opposite ends to said spring units, and
      (f) said spring units being expansible and contractible along essentially parallel axes disposed laterally outwardly of said frame and of the longitudinal centerline of said spring leaf.

12. The spring suspension defined in claim 11 wherein said spring leaf is formed with a decreasing taper from a region of maximum thickness fixed to said axle out to the pivot connections to said frame.

References Cited by the Examiner

UNITED STATES PATENTS

| | | | |
|---|---|---|---|
| 1,273,813 | 7/1918 | Bernat | 267—31 |
| 1,539,272 | 5/1925 | Prescott | 267—67 X |
| 2,180,860 | 11/1939 | Brown | 267—65 |
| 2,211,647 | 8/1940 | Collier | 267—38 |
| 2,608,752 | 9/1952 | Schilling | 267—47 X |
| 2,952,455 | 9/1960 | Neuville et al. | 267—31 X |
| 2,965,391 | 12/1960 | Whelan. | |
| 2,969,975 | 1/1961 | Chuba. | |
| 3,063,703 | 11/1962 | Harbers et al. | 267—65 |

FOREIGN PATENTS 664,414  4/1929  France.

OTHER REFERENCES

K.-H.-D. A.-G., German application 1,108,089, printed May 31, 1961 (K1.63c 38/01).

ARTHUR L. LA POINT, *Primary Examiner.*